Feb. 17, 1953 A. H. LAWRENZ 2,628,445
FISHING ROD WITH DISAPPEARING SPIKE
Filed May 10, 1949
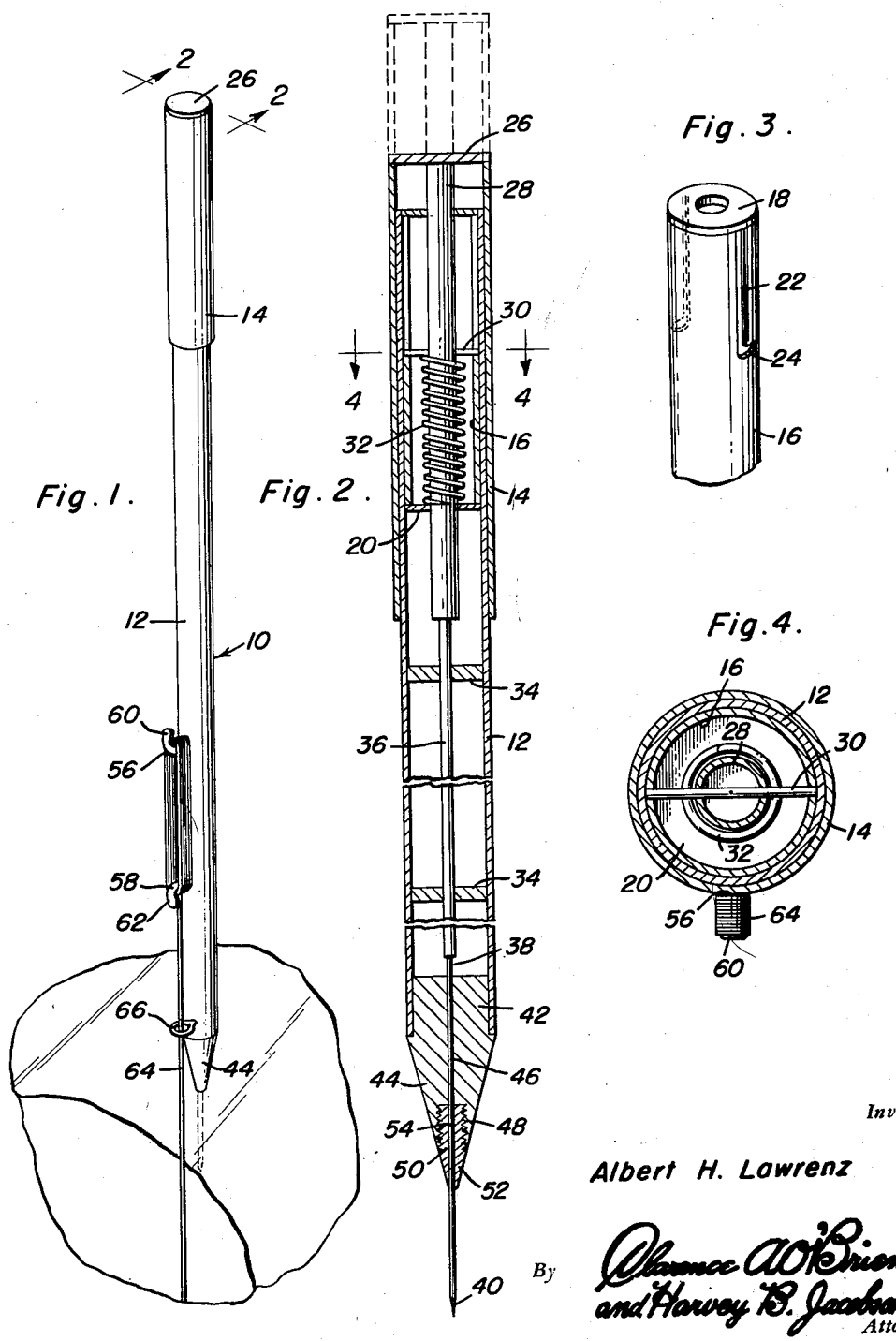
Inventor
Albert H. Lawrenz Patented Feb. 17, 1953

2,628,445

UNITED STATES PATENT OFFICE 2,628,445

FISHING ROD WITH DISAPPEARING SPIKE

Albert H. Lawrenz, Gaylord, Minn.

Application May 10, 1949, Serial No. 92,413

1 Claim. (Cl. 43—21.2)

This invention relates to new and useful improvements in fishing poles and the primary object of the present invention is to provide a stick for ice fishing and having a retractable or disappearing point.

Another important object of the present invention is to provide a winter fishing stick having a slidable spike or point that is adapted to be extended into the ice adjacent a hole in the ice, and embodying novel and improved means for retaining the spike extended from the stick.

A further object of the present invention is to provide a winter fishing stick with a disappearing point or spike and so constructed as to permit the spike to be extended from the stick when in use or quickly and readily retracted into the stick for convenient and safe handling of the stick when the point is not being employed for anchoring the stick to the ground or ice.

A still further aim of the present invention is to provide a fishing stick or pole of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention anchored to the ice adjacent a fishing hole;

Figure 2 is a longitudinal vertical sectional view taken substantially on the plane of section line 2—2 of Figure 1 and with dotted lines showing the handle and sliding member raised;

Figure 3 is a fragmentary perspective view of the sleeve insert used in conjunction with the present invention; and Figure 4 is an enlarged transverse horizontal sectional view taken substantially on the plane of section line 4—4 of Figure 2.

Referring now to the drawings in detail, wherein, for the purpose of illustration, there is disclosed a preferred embodiment of the present invention, the numeral 10 represents the present fishing stick, pole or rod generally, including a first or inner tubular member 12 and an outer or second tubular member or hand grip 14.

The outer tubular member 14 embraces the inner tubular member 12 and is slidable and rotatable on one end of the inner tubular member.

A sleeve insert 16 is suitably fixed within the inner tubular member 12 and supports a guide ring 18 at its upper end and a combined guide ring and abutment 20 at its lower end. The sleeve 16 is provided with a pair of diametrical opposed bayonet slots 22 and the lateral offset 24 for the slots 22 extend in the same direction, either clockwise or counter-clockwise.

Rigidly secured by welding or the like to the upper or outer end of the tubular member 14 is a closure plate 26 to which there is fixed a rod or shaft 28. The shaft 28 is disposed axially with respect to the members 12 and 14, as well as sleeve 16, and the shaft 28 is slidably received by the rings 18 and 20.

Extending transversely through and secured to the shaft 28 is a guide rod or locking pin 30, the ends of which are slidably received in the slots 22.

A coil spring 32, embracing the shaft 28, is biased between the pin 30 and the abutment 20 to urge the shaft 28 and the outer tubular member 14 to a raised position or outward position with respect to the inner tubular member 12.

A plurality of longitudinally spaced guides 34 are fixed to the inner wall of the inner tubular member 12 and slidably receive a further rod or shaft 36. The upper end of the further shaft 36 is fixed to the lower end of the shaft 28, and the lower end of the shaft 36 is rigidly secured to a still further rod, shaft, point or spike 38 having a pointed lower extremity 40.

The reduced end 42 of a conical plug or guide 44 is fixed within the lower end of the inner tubular member 12 and includes an axial bore 46 that slidably receives the spike 38. The minor end of the plug 44 is provided with an internally threaded recess 48 that receivably engages an externally threaded reinforcing plug 50 having a tapered lower end 52. The plug 50 is also formed with an axial bore 54 that receives the point 38.

A pair of spaced parallel, laterally projecting upper and lower lugs 56 and 58 are secured to the inner tubular member 12 and their ends are respectively turned upwardly and outwardly to provide retaining flanges 60 and 62. A fishing line 64 is wound about the lugs 56 and 58 and extends downwardly through an eye 66 projecting laterally from the lower end of the member 12.

In practical use of the present invention, the point 38 is normally concealed within the member 12 and the member 14 and shafts 28 and 36 are raised relative to the member 12. In order to expose the point 38, the member 12 is held stationary and the member 14 is pressed downwardly and rotated so that the pin 30 will enter the offsets 24 and the spring 32 will be in compression.

To retract the point 38, the member 14 is rotated relative to the member 12 and the spring 32 will raise the shafts 28, 36 and 38 as well as the member 14 with respect to the member 12.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A fishing rod with a disappearing point comprising a first elongated tubular member having upper and lower ends, a second relatively short tubular member telescoped over the upper end of said first member and slidably and rotatably carried by the first member, a sleeve fixed within the upper end of said first member reinforcing and strengthening the upper end of said first member, upper and lower end plates fixed to the ends of said sleeve and having central apertures, a sliding rod having an upper portion extending through said apertures and fixed to said second member for movement with the latter, said rod having a lower pointed end, a guide plug secured to the lower end of said first member and having an axial bore slidably receiving the lower end of said rod, longitudinally spaced guides fixed in said first member between said plug and said sleeve slidably guiding the rod, a pin extending transversely through said rod and having end portions projecting laterally from diametrically opposite sides of the rod and located between said upper and lower end plates, and a coil spring embracing the rod and enclosed within said sleeve and biased between said lower end plate and the ends of said pin and yieldingly urging the lower end of said rod into said first member, said sleeve having a pair of opposed bayonet slots slidably receiving the ends of the pin.

ALBERT H. LAWRENZ.

REFERENCES CITED

The following references are of record in the file of this patent:

UNITED STATES PATENTS

| Number | Name | Date |
|---|---|---|
| 164,574 | McCall | June 15, 1875 |
| 705,441 | Putney | July 22, 1902 |
| 926,346 | Mann | June 29, 1909 |
| 1,034,222 | Dych | July 30, 1912 |
| 1,074,307 | Wood | Sept. 30, 1913 |
| 1,126,370 | Borresen | Jan. 26, 1915 |
| 1,131,915 | Davidson | Mar. 16, 1915 |
| 1,181,681 | Nicaud | May 2, 1916 |
| 1,343,101 | Weaver | June 8, 1920 |
| 1,424,221 | Trumpeter | Aug. 1, 1922 |
| 1,797,016 | Osborne | Mar. 17, 1931 |
| 2,241,183 | Ceder | May 6, 1941 |
| 2,546,489 | Wright | Mar. 27, 1951 |

FOREIGN PATENTS

| Number | Country | Date |
|---|---|---|
| 77,882 | Sweden | July 25, 1933 |